United States Patent [19]

Fukumochi et al.

[11] Patent Number: 4,833,611
[45] Date of Patent: May 23, 1989

[54] MACHINE TRANSLATION SYSTEM

[75] Inventors: Yoji Fukumochi; Shinji Tokunaga; Hitoshi Suzuki; Syuzo Kugimiya; Shinobu Shiotani; Ichiko Sata, all of Nara, Japan

[73] Assignee: Sharp Kabushiki Kaisha, Osaka, Japan

[21] Appl. No.: 66,549

[22] Filed: Jun. 26, 1987

[30] Foreign Application Priority Data

Jun. 27, 1986 [JP] Japan ................... 61-152066

[51] Int. Cl.⁴ ............................................. G06F 15/38
[52] U.S. Cl. ..................................... 364/419; 364/900
[58] Field of Search ............... 364/419, 900 MS File, 364/200 MS File

[56] References Cited

U.S. PATENT DOCUMENTS 4,641,264 2/1987 Nitta .................................. 364/900
4,661,294 4/1987 Okamoto et al. ................... 364/900
4,750,122 6/1988 Kaji ................................. 364/900

FOREIGN PATENT DOCUMENTS 0201096 11/1986 European Pat. Off. .
215282 10/1985 Japan .................................. 364/419
2122782 1/1984 United Kingdom .
2177242 1/1987 United Kingdom .

Primary Examiner—Joseph Ruggiero
Assistant Examiner—Steven G. Kibby
Attorney, Agent, or Firm—Birch, Stewart, Kolasch & Birch

[57] ABSTRACT

A machine translation system for translating inputted sentences using a translation dictionary, defined grammatical rules and tree conversion rules. The translation system is capable of producing partial translation when the entire sentence cannot be translated as a whole. Each translated portion is representative of an analyzed partial tree of the complete inputted sentence.

8 Claims, 5 Drawing Sheets

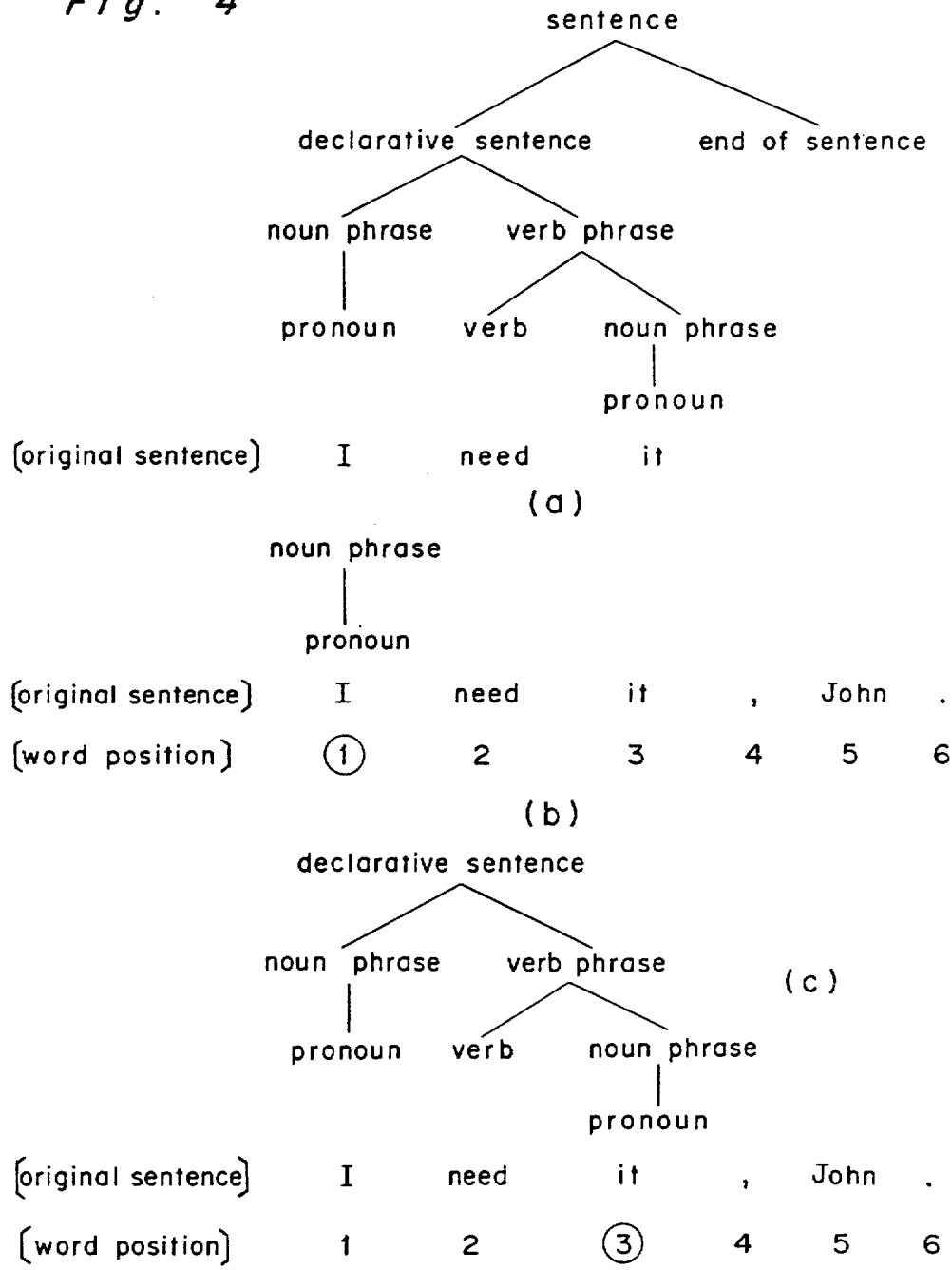

Fig. 5

| I need it. | WATAKUSHI WA SOREO HITSUYO TO SURU. (Japanese sentence) |

Fig. 6

| I need it, John. | ★WATAKUSHI WA SOREO HITSUYO TO SURU. (Japanese sentence)<br>★John | ature, are given by way of illustration only, since various
changes and modifications within the spirit and scope of
MACHINE TRANSLATION SYSTEM

BACKGROUND OF THE INVENTION

The present invention generally relates to a machine translation system and, more particularly, to a translating device which is so arranged as to translate an analyzed partial tree among inputted source words where the totality of inputted source words cannot be analyzed as a whole.

DESCRIPTION OF THE PRIOR ART

In prior art translation systems, syntax has been analyzed in a backtrack system employing context free grammar rules.

The backtrack system referred to above is such that when a plurality of possibilities for the analysis of syntax exist, those possibilities are tried one by one. If the analysis stalls at some point, the system returns to a point in the source words where another possibility is found for the analysis.

According to the above-described system for syntax analysis, the analyzing process is repeatedly performed until all of the inputted source words are arranged into one phrasal structure by using the context free grammar conversion rules.

Alternatively, in some cases, one translated phrasal structure cannot be achieved because of: (a) an error in an original text; (b) a lack of necessary grammatical rules; or a delay in analysis beyond a prearranged time resulting in failure of the analysis.

Once the analysis ends in failure in the prior art translation system, an output to the subsequent converting process and the generating process cannot be obtained. Accordingly, the translation cannot be achieved at all even though in actuality the translation has been partially effected.

SUMMARY OF THE INVENTION

Accordingly, an essential object of the present invention is to provide an improved translating device capable of producing a partial translation of an inputted sentence so that a partial tree analyzed for every part of the inputted source words can be outputted to the converting and the generating processes in the case where the inputted source words cannot be analyzed as a whole.

In accomplishing the above-described object, a translating device of the present invention is provided with a central processing unit (CPU) for performing translations, a main memory for storing programs, a CRT display unit for displaying a translated sentence, a keyboard for inputting an original text into the device, and a translation module for storing data necessary for the translating process.

The translation module includes a table means containing a translation dictionary, grammatical rules and tree structure converting rules. Moreover, the translation module stores data at each level of the translating process.

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description of the preferred embodiment thereof with reference to the accompanying drawings which are given by illustration only and thus are not limitative of the present invention; and wherein

FIGS. 4(a)–4(c) are explanatory diagrams of an automatic divisional translation as preformed by the translating device of FIG. 1; and FIGS. 5 and 6 are respective views of a display showing an output of a translated sentence as produced by the translating device of FIG. 1.

DESCRIPTION OF THE PREFERRED EMBODIMENT

Figure 1:
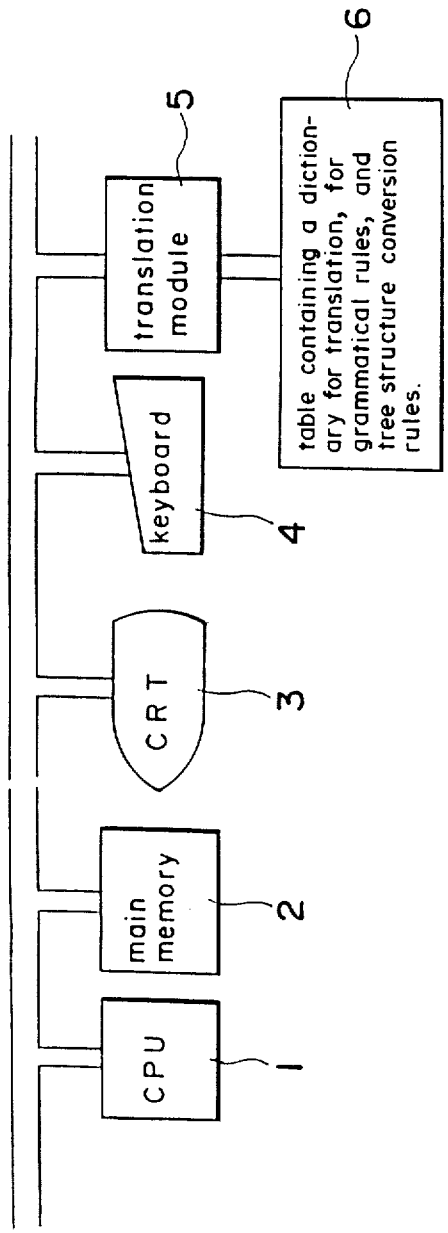
FIG. 1 is a block diagram of a translating device according to a preferred embodiment of the present invention.

Referring to a block diagram of FIG. 1, a translating device according to the present invention is provided with a CPU 1 for controlling the translating process, a main memory 2 for storing programs or the like for use by the CPU 1, a CRT display unit 3 for displaying a translated sentence, a keyboard 4 for inputting an original untranslated sentence into the device and a translation module 5 for storing necessary data for the translation.

The above-described translation module 5 includes a table 6 containing a translation dictionary, grammatical rules and tree structure conversion rules. Moreover, the translation module 5 stores data at each level of the analysis during the translating process.

Generally, the machine translation is performed by using a pivot method or transfer method in terms of the analyzing level. According to one embodiment of the present invention, the translation is conducted at least to the level of the dictionary look-up morpheme analyzing process and the syntax analyzing process.

The dictionary look-up morpheme analysis above refers to referencing source words in the translation dictionary to obtain grammatical information such as its part of speech and other translated words or equivalents with respect to each of the source words, and also analyzing the tense, person and number, of the source words in the inputted sentence. Conversely the aforementioned syntax analysis determining the syntax of the sentence including the correlation between the sources words.

Figure 2:
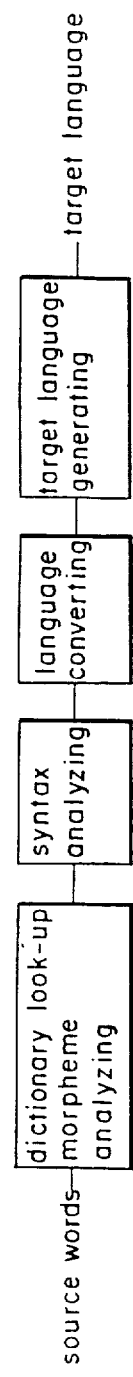
FIG. 2 is a diagram showing the construction of a translation module in the translating device of FIG. 1.

The structure of the translation module 5 is schematically shown in the diagram of FIG. 2.

As shown in FIG. 2, the translation module 5 includes a dictionary look-up morpheme analyzing function into which the source words are inputted, a syntax analyzing function, a language converting function and a target language generating function.

Figure 3A:
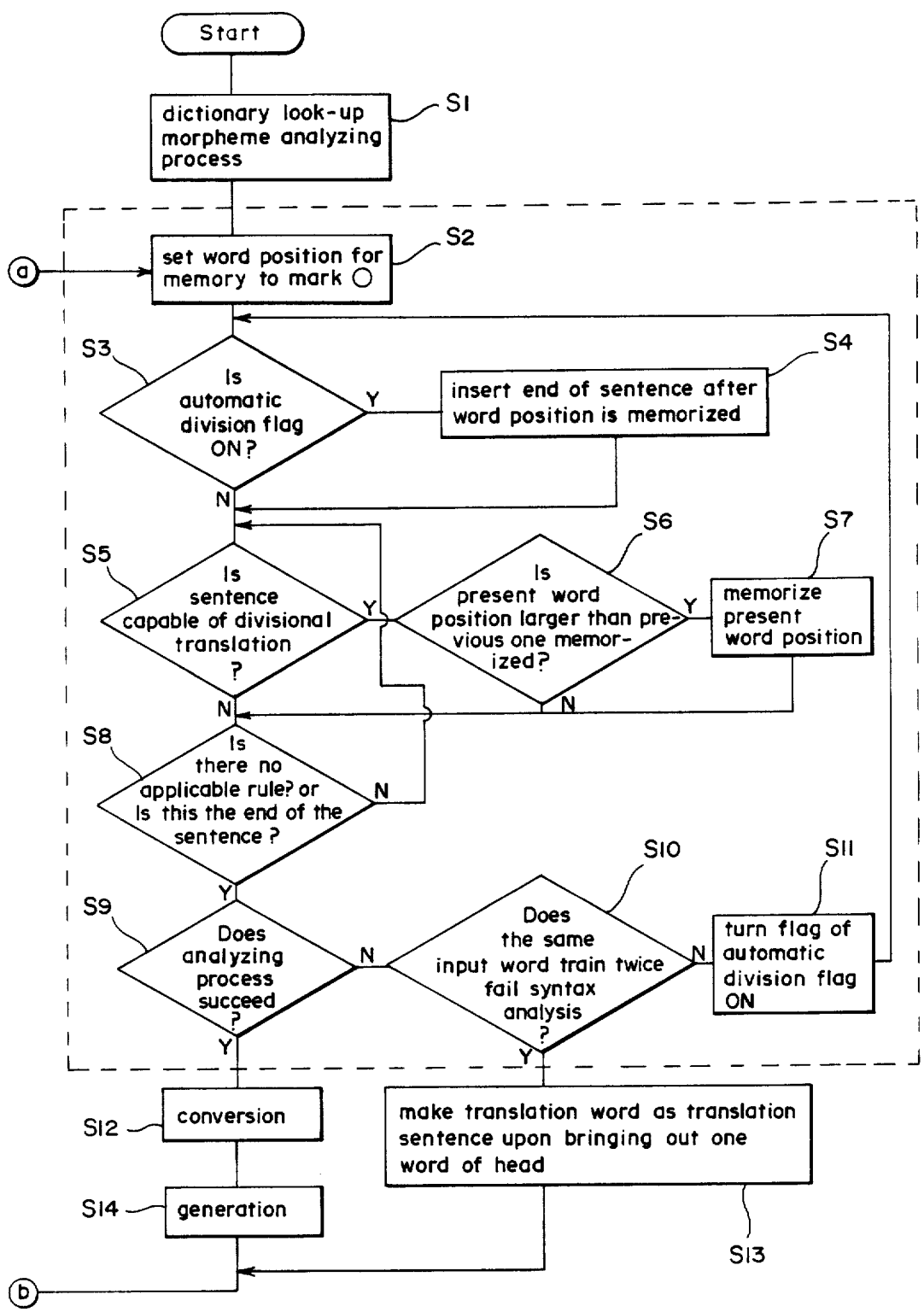
FIGS. 3a and b are a flow-chart of an operation of the translating device of FIG. 1.
Figure 3B:
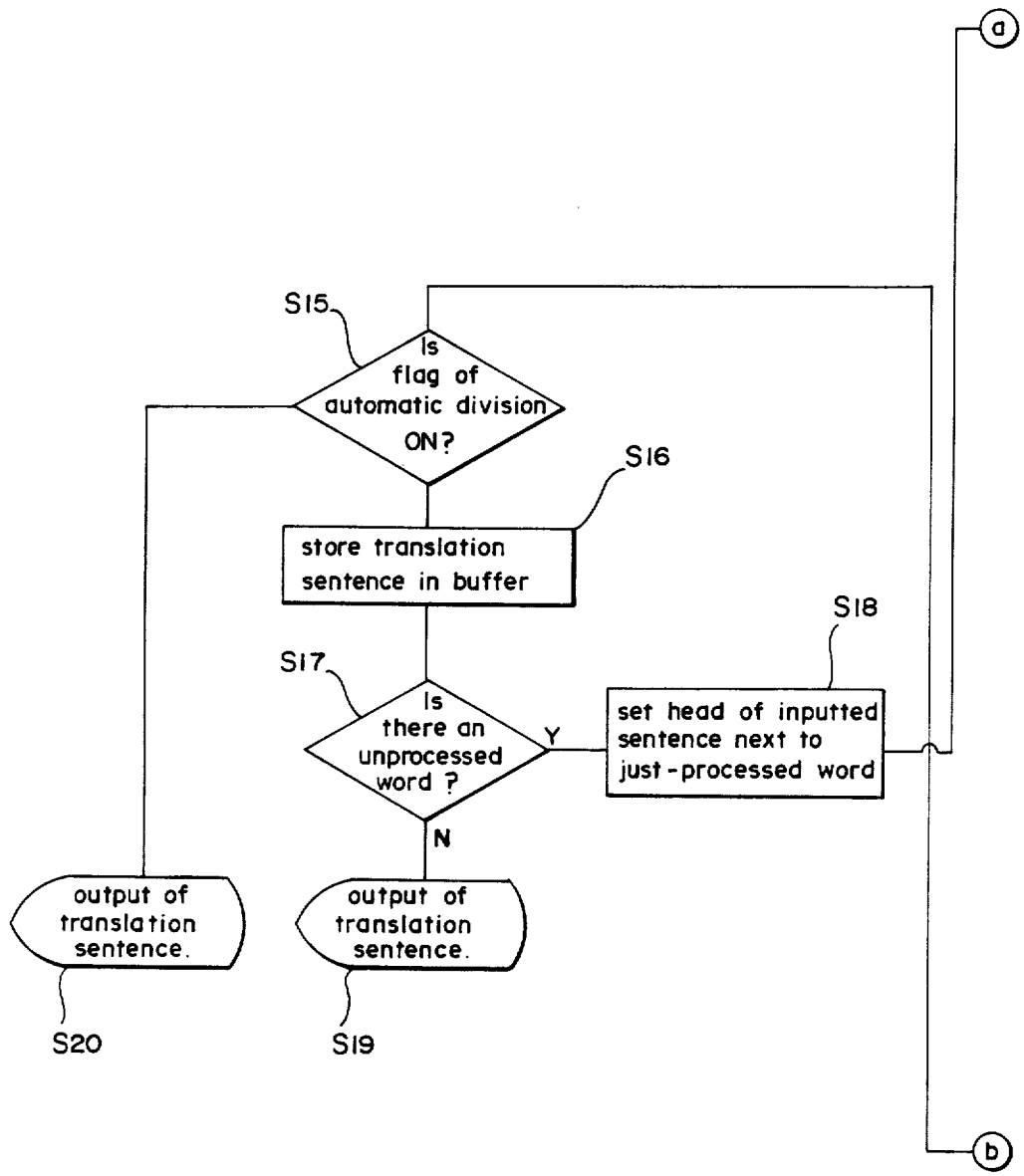

FIG. 3 is a flow-chart representing the operation of the translation device of the present invention.

It is to be noted here that according to the present embodiment, only the grammatical rules shown in the Syntax Table below are stored in the table 6.

SYNTAX TABLE (a) a sentence→A declarative sentence + the end of the sentence
(b) a declarative sentence→a declarative sentence + a subordinate clause
(c) a declarative sentence→a declarative sentence + a conjunction + a declarative sentence
(d) a declarative sentence→a noun phrase + a verb phrase
(e) a sentence→a noun phrase + the end of the sentence
(f) a noun phrase→a noun
(g) a noun phrase→a pronoun
(h) a verb phrase→a verb + a noun phrase
(i) a verb phrase→a verb Grammatical rule (a) states that a sentence consists of a declarative sentence and the end of the sentence.

Grammatical rule (b) states that a declarative sentence is composed of a declarative sentence and a subordinate clause.

Grammatical rule (c) states that a declarative sentence is composed of a declarative sentence, a conjunction and a declarative sentence.

Grammatical rule (d) indicates that a declarative sentence consists of a noun phrase and a verb phrase.

Grammatical rule (e) indicates that a sentence is composed of a noun phrase and the end of the sentence.

Grammatical rule (f) indicates that a noun phrase is made of a noun.

Grammatical rule (g) requires that a noun phrase be a pronoun.

Grammatical rule (h) requires that a verb phrase consists of a verb and a noun phrase.

Grammatical rule (i) requires that a verb phrase consists of a verb.

For example, supposing that both (A) "I need it." and (B) "I need it John." are separately inputted.

In the translation of (A), the logic flow goes from step S1, where the dictionary look-up morpheme analysis is performed, to various steps for the syntax analysis. The steps representing the syntax analysis function are encircled in FIG. 3(A) by a dashed line. In steps S5 and S8 the grammatical rules shown in the above Syntax Table are applied to grow the syntax analysis tree, thereby to repeat the backtracking.

As a result, the structure of a phrase is produced as shown in FIG. 4(a). Then, in response to the completion of syntax analysis up to the end of the sentence, the logic flow proceeds from step S8 to step S9. The analysis ends in succession and the syntax analysis is completed.

After the syntax analysis, the converting process and the generating process are performed, respectively, represented in step S12 and step S14. Finally, a translated sentence is outputted for display by the display unit. The content of the display is shown in FIG. 5.

In the second example, once (B) is inputted, the logic flow proceeds to the syntax analysis, after completing the dictionary look-up morpheme analyzing process in step S1, as described earlier.

The position of each word in the inputted sentence is analyzed in order from the beginning word of the sentence. Therefore, with respect to the inputted sentence (B), the word "I" is allocated at word position 1, the word "need" at 2, the word "it" at 3, the word "," at 4, the word "John" at 5 and the word "." at 6, respectively.

The syntax analysis sequentially performed in accordance with the word position in step S2.

An automatic divisional flag is turned on when the syntax analysis is determined to be a failure. When the syntax analysis is started, the flag is cleared, and therefore the flag is in an off state at the beginning. Accordingly, the logic flow proceeds from step S3 to S5 to S6 where the structure of a phrase as show in FIG. 4(b) is produced.

Once the structure of the phrase shown in FIG. 4(b) is produced, since it is decided in step S5 that the inputted sentence is divisionaly translatable, the logic flow runs from step S5 to step S6 and further to step S7, such that the word position 1 for the word "I" is stored.

After step S7 is finished, the logic flow goes to step S8; since the remaining unprocessed words, "need it John.", are detected in step S8, the grammatical rules can still be applied in step S8 and the logic flow returns to step S5.

Consequently, by the grammatical rules (h) and (d), the phrasal structure as shown in FIG. 4(c) is obtained.

Thereafter, the logic flow proceeds from step S5 to step S7 in the same manner as described earlier, thereby to advance the word position to 3, that completes the phrase "I need it".

Although the logic flow again proceeds from step S7 to step S8, it is judged in step s8 that no grammatical rules are applicable to the inputted sentence, and accordingly, the logic flow goes to step S9.

In step S9, it is determined that the analysis is a failure because there are words ", John." are not processed. Thus, the logic flow moves from step S9 to step S11 where the automatic divisional flag is turned on.

Then the flow is returned back to the start of the syntax analysis.

All of the trees of the phrasal structure are finished, with the logic flow moving to step S4 by the positive judgement in step S3. In step S4, the end of the sentence is inserted next to the word position 3 of the inputted sentence in the buffer, such that "I need it." is analyzed, thereby to obtain the structure of the phrase shown in FIG. 4(a).

Thereafter, the flow passes from the syntax analyzing process through the conversion process in step S12 and the generation process in step S14 to step S15. Since the automatic divisional flag is turned on in step S15, the flow moves to step S16 where the generated translated sentence is stored in the buffer.

Upon completion of the operation in step S16 described above, since it is detected in step S17 that unprocessed words ", John." still remain, the head word "," of the inputted sentence is set next to the just-processed word in step S18. Then, the logic flow is returned again to step S2, to resume the syntax analysis.

The analysis with respect to the unprocessed words ", John." fails in step S10, and accordingly the head word "," is divided from the other unprocessed words in step S13. At this time generally, the translation of the divided word is stored in the buffer means in step S16. However, since the translation dictionary in the present embodiment contains no translation for the word ",", the word is not actually inputted in the buffer.

Finally, the analysis with respect to the words "John." is carried out with success by the application of the grammatical rules (f) and (e). Accordingly, the translated sentence in the automatic divisional translation method is outputted in step S19. The content of the outputted translation is shown in FIG. 6.

Although it is so arranged in the above-described embodiment that the translation is carried out for every analyzed partial tree among the inputted source words when the syntax analysis of the whole sentence cannot be done, this arrangement may possibly be utilized when other analysis, that is, the meaning analysis (to distinguish what is correct from what is incorrect from results of the syntax analyses) fails.

As is made clear from the foregoing description, the translating device according to the present invention is arranged to output a translated sentence with respect to an inputted sentence through an analyzing operation. Particularly when the analysis is not able to be completed for the whole group of source words in the inputted sentence, the translation is effected for every analyzed partial tree of the inputted source words. Accordingly, the present invention is advantageous over the prior art for the following reasons:

(a) accordingly to the prior art machine translation system, if the syntax analysis fails, no translation is produced at all. Further, if the entirety of the inputted text cannot be translated, the prior art translation system has practically no usefulness. In comparison with the above-described prior art translation system, the translating device of the present invention is able to output a partial translation of the text even though the entire text may be unanalyzable. Therefore, by editing the partial translations, an effective translated sentence can be obtained;

(b) There are so many exceptions in natural languages subject to machine translation that it is hardly possible to form common grammatical rules to analyze all of the texts. Moreover, even if such grammatical rules were constructed, the number of grammatical rules would be extremely large and complex, and therefore it would be quite difficult to maintain and improve the grammatical rules. Conversely, since the present invention can handle the natural languages with limited grammatical rules, it is easy to maintain and improve the grammatical rules; and (c) Since and when the result of the automatic divisional translation is displayed on the screen, calling a user's attention to the fact that the original text cannot be analyzed, the user can check errors in the original text.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic translation system for producing a partial or complete translation from a source language to a selected target language, comprising:
   input means for inputting a collection of source words for translation;
   memory means in electronic communication with said input means for storing said collection of source words;
   syntax table means for storing a defined set of grammatical rules;
   syntax analyzing means for determining a syntax tree structure from said collection of source words using said grammatical rules stored in said syntax table;
   detecting means responsive to said syntax analyzing means for detecting whether a syntax tree structure can be produced from said collection of source words; and
   means responsive to said detecting means for determining whether said collection of source words can be divisionally analyzed and for producing a partial tree structure from those source words which collectively correspond to the grammatical rules stored in said syntax table means.

2. An electronic translation system as recited in claim 1, further comprising:
   dictionary means for storing translation data for individual words of said source language; and
   translation analysis means for identifying translation data stored in said dictionary means with the source words contained in said collection of source words.

3. An electronic translation system as recited in claim 2, further comprising:
   language conversion means for converting a syntax tree structure produced by said syntax analyzing means and said detecting means from said language to said target language.

4. An electronic translation system as recited in claim 3, further comprising:
   target language generating means responsive to said translation analysis means for generating a word from said target language corresponding to each source word contained in said collection of source words.

5. An electronic translation system as recited in claim 4, further comprising:
   output means in communication with said language conversion means and said target generating means for outputting translated and untranslated words from said collection of source words.

6. An electronic translation system as recited in claim 5, wherein said output means is a display means.

7. An electronic translation system as recited in claim 5, further comprising:
   translation buffer means for storing translated source words produced by said language conversion means and said target language generating means and for storing untranslated source words from said collection of source words.

8. A method for producing a complete or partial translation of a collection of source words from a source language to a target language using a translation dictionary and a defined set of grammatical rules, the steps comprising:
   analyzing said collection of source words using said grammatical rules for determining a syntax tree structure reflective of the correlation between said collection of source words and said grammatical rules;
   translating said collection using the syntax tree structure from said source language to said target language;
   detecting whether one or more source words in said collection are not contained in said translation dictionary;
   determining whether said collection of source words can be analyzed to produce a partial syntax tree structure from said collection excluding any source word not detected in said translation dictionary; and
   producing a partial translation from said source words correlated to said translation dictionary and said defined set of grammatical rules.

* * * * *